US008046249B2

(12) United States Patent
Hitz

(10) Patent No.: US 8,046,249 B2
(45) Date of Patent: Oct. 25, 2011

(54) SYSTEM AND METHOD FOR COMPUTER NETWORK SCHEDULING AND COMMUNICATION

(76) Inventor: John F. Hitz, Wilmington, IL (US)

( * ) Notice: Subject to any disclaimer, the term of this patent is extended or adjusted under 35 U.S.C. 154(b) by 983 days.

(21) Appl. No.: 11/956,524

(22) Filed: Dec. 14, 2007

(65) Prior Publication Data

US 2008/0147472 A1    Jun. 19, 2008

Related U.S. Application Data

(60) Provisional application No. 60/875,275, filed on Dec. 15, 2006.

(51) Int. Cl.
*G06Q 40/00* (2006.01)
(52) U.S. Cl. ..................... 705/7.11; 705/7.13
(58) Field of Classification Search .................. 705/7.11
See application file for complete search history.

(56) References Cited

U.S. PATENT DOCUMENTS

| 5,111,391 | A  | * | 5/1992  | Fields et al. ............... 705/7.14 |
| 5,696,702 | A  | * | 12/1997 | Skinner et al. ............. 702/186 |
| 6,049,776 | A  | * | 4/2000  | Donnelly et al. ........... 705/7.14 |
| 6,415,259 | B1 | * | 7/2002  | Wolfinger et al. .......... 705/7.13 |
| 6,970,829 | B1 | * | 11/2005 | Leamon ...................... 705/7.14 |
| 7,155,399 | B2 | * | 12/2006 | Andre et al. ................ 705/7.14 |
| 7,599,841 | B1 | * | 10/2009 | Koller et al. ................ 705/320 |
| 7,672,746 | B1 | * | 3/2010  | Hamilton et al. ............ 700/100 |
| 2002/0040313 | A1 | * | 4/2002 | Hunter et al. .................. 705/9 |
| 2004/0267591 | A1 | * | 12/2004 | Hedlund et al. ................ 705/9 |

FOREIGN PATENT DOCUMENTS

| EP | 1 152 356 | 11/2001 |
| WO | WO 02/29652 | 4/2002 |
| WO | WO 2004/053749 | 6/2004 |

OTHER PUBLICATIONS

International Search Report corresponding to International Application Serial No. PCT/US2007/087634, mailed Jun. 3, 2008, 5 pages.
Written Opinion of the International Searching Authority corresponding to International Application Serial No. PCT/US2007/087634, mailed Jun. 3, 2008, 7 pages.
Business Editors et al., "IEX enhances award-winning workforce management solution", Internet Citation, [Online] XP002978321, http://www.iex.com, retrieved Jul. 21, 2001.

* cited by examiner

*Primary Examiner* — Thomas Dixon
*Assistant Examiner* — Benjamin S Fields
(74) *Attorney, Agent, or Firm* — McAndrews, Held & Malloy, Ltd.

(57) ABSTRACT

Certain embodiments of the present invention provide for a system and method for computer network scheduling and communication. In an embodiment, a computer network scheduling and communication system includes a settings module for selecting one or more preferences. The system also includes a calendar module adapted to generate one or more schedules based on the one or more preferences. In addition, the system includes a communication module for sending and receiving one or more messages. The system also includes a database for storing the one or more preferences, the one or more schedules and/or the one or more messages.

22 Claims, 2 Drawing Sheets

SYSTEM AND METHOD FOR COMPUTER NETWORK SCHEDULING AND COMMUNICATION

RELATED APPLICATIONS

The present application claims priority under 35 U.S.C. §119(e) to provisional application Ser. No. 60/875,275, filed on Dec. 15, 2006, the entire contents of which are hereby expressly incorporated herein by reference.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present invention generally relates to computer network scheduling and communication. In particular, the present invention relates to scheduling labor with a task to be performed using a system and method for computer network scheduling and communication.

Traditionally, the scheduling of temporary staff is done through the use of agencies or job placement services. The relationship between agencies and hiring companies is facilitated by a series of calls initiated between the company staffing coordinators, agency schedulers, and individuals seeking employment through the agency. The process of matching an individual seeking temporary employment with a company seeking a temporary employee is convoluted, inefficient and at times, frustrating. Multiple phone calls may be required between the agency and the hiring company, and the agency and a potential employee, before a shift gets scheduled. Eventually, the hiring company usually obtains a temporary employee that the hiring company knows little about. Further, the individual seeking employment may be limited by the time and effort the agency expends searching for employment on behalf of the potential employee.

For permanent employees in industries such as construction, police enforcement, nursing and firefighting, among other things, the needs of a construction company, police precinct, hospital, fire precinct, or the like may vary depending on how busy the company, precinct or hospital is on a given day. Permanent employees in these fields may be forced to take time off if business is slow, while other companies, precincts and hospitals may have a surge in business and need extra help. The companies, precincts hospitals, and the like would benefit from having contact and scheduling capabilities with employees in their industry that may be able to pick up a shift when things are busy without having to permanently make a position for the employee at the company, precinct, or hospital, among other things. Further, employees at the companies, precincts and hospitals would benefit from being able to find temporary employment at another company, precinct, or hospital when the employee's permanent employer does not have the work to keep the employee busy.

When scheduling temporary employment, hiring companies would reduce cost, save time, and find more suitable potential employees by having direct contact with potential employees to learn about the potential employees and expedite the scheduling process. Potential employees would save time and find more suitable employers if the potential employees had some control of how, when, where and for who a potential employee was being marketed. The cost of staff and office space needed for scheduling tasks is decreased by minimizing the role of the agency. In industries where the employment needs of the employers are constantly changing, employers and permanent employees would save time and reduce cost from having access to a scheduling system allowing employers and permanent employees to meet their scheduling requirements. Thus, there is a need for a system and method for computer network scheduling and communication to decrease cost while improving the efficiency and effectiveness in scheduling labor with a task to be performed.

BRIEF SUMMARY OF THE INVENTION

Certain embodiments of the present invention provide systems and methods for a computer network scheduling and communication system. In an embodiment, a computer network scheduling and communication system includes a setting module for selecting one or more preferences. The system also includes a calendar module adapted to generate one or more schedules based on the one or more preferences. In addition, the system includes a communication module for sending and receiving one or more messages. The system also includes a database for storing the one or more preferences, the one or more schedules and/or the one or more messages.

Certain embodiments of the present invention provide systems and methods for a computer network scheduling and communication system. In an embodiment, a method for computer network scheduling and communication includes specifying one or more preferences. The method also includes generating one or more schedules based on the one or more preferences. In addition, the method includes selecting one or more scheduling events from the one or more schedules. The method also includes communicating one or more confirmation messages based on the selected one or more scheduling events. The method also includes storing the one or more preferences, the one or more schedules, the one or more scheduling events and/or the one or more confirmation messages.

Figure 1:
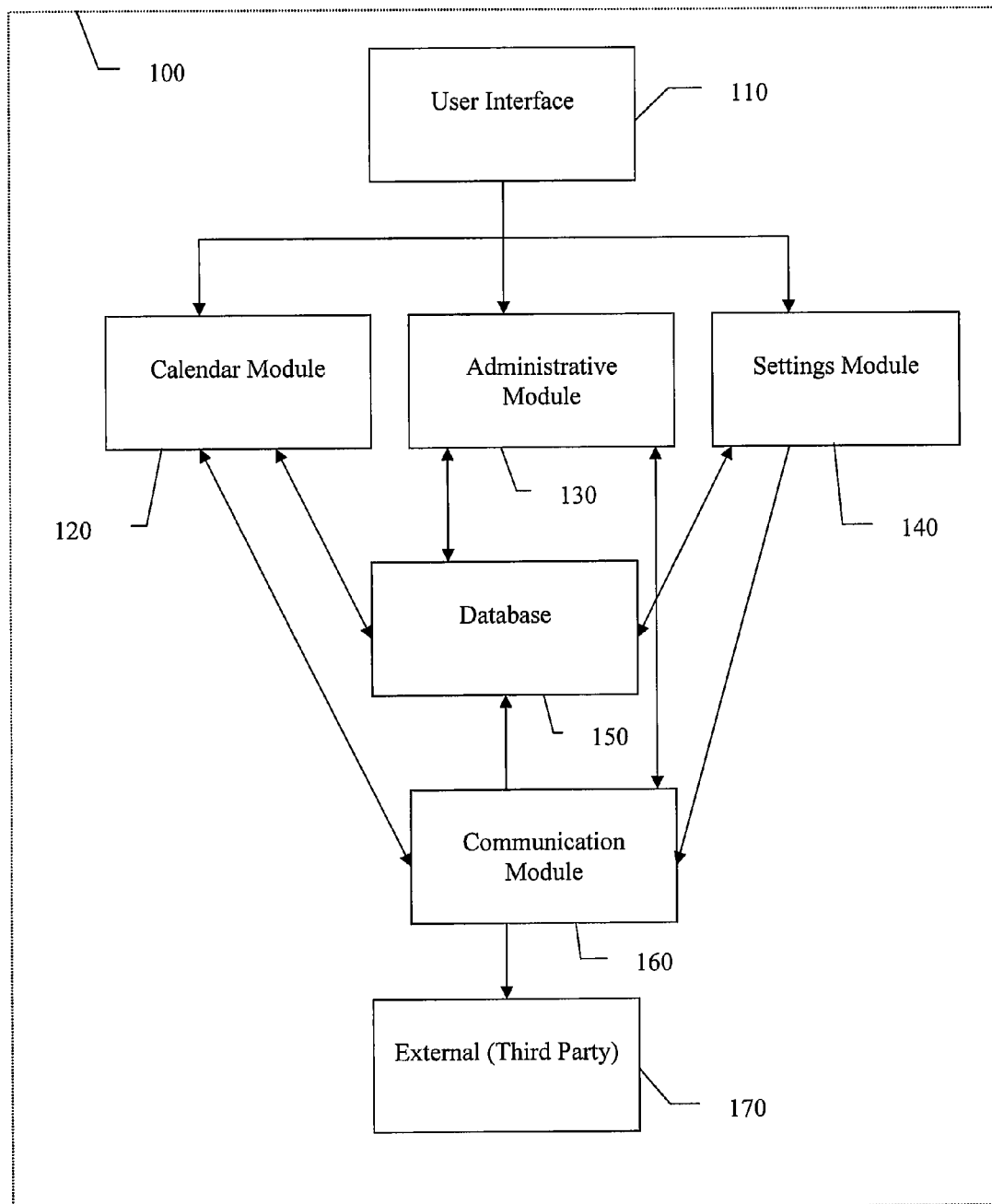
FIG. 1 illustrates a computer network scheduling and communication system used in accordance with an embodiment of the present invention.

The foregoing summary, as well as the following detailed description of certain embodiments of the present invention, may be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE INVENTION

FIG. 1 illustrates a computer network scheduling and communication system 100 used in accordance with an embodiment of the present invention. The system 100 includes a user interface 110, a calendar module 120, a settings module 140, a database 150, and a communication module 160. The system may also include an administrative module 130 which may include sub-modules for accounting, reporting, and/or human resources (not shown in FIG. 1), for example. The communication module 160 may include components for creating and/or sending automated fax messages, automated text messages, automated voice mail, and/or automated electronic mail, among other things. The components of the system 100 may communicate via wired and/or wireless connections on one or more processing units, such as computers, storage devices, custom processors, and/or other processing units. The system 100, its modules and sub-modules may be implemented in software and/or hardware. In certain embodiments, the computer network scheduling and communication system 100 is integrated into a single unit, or may be integrated in various forms.

In an embodiment, there is a plurality of classes of users of the system 100. The user class defines the functions available for each user, and the level of access that a given user may be allowed within the system 100. Restricting the functions available for each user may allow for security while maintaining the optimum level of functionality for each user. Examples of user classes may vary depending on the use of the system 100. For exemplary purposes, the below description is used for scheduling and communication in a medical environment although, the system 100 may be used for scheduling and communication for other purposes. For example, the computer network scheduling and communication system may be used for scheduling and communication in the construction industry, police enforcement, firefighting, to schedule temporary employees, to schedule golf tee times, to organize first responders in the event of a disaster, to schedule meetings and/or events within a company, and to organize and schedule catering and vendors in planning a wedding or party in the hospitality industry, among other things. In a medical scheduling environment, examples of users may include, but are not limited to, administrators, staff users (including primary staff users and secondary staff users), staffing agency administrators, staffing agency users, certification administrators, and certification users, among other things. Examples of medical facilities may include hospitals, clinics, doctor's offices, Red Cross emergency tents, and the like.

Medical facility administrators may include hospital administrators, charge nurses, and supervisors at a medical facility, for example, that may use the system 100 to develop schedules for a specific medical unit, such as an emergency room, surgery, or neo-natal intensive care unit, among other things. Medical facility administrators may have the authority to hire staff and define positions.

Staff users may include medical personnel, such as doctors, nurses, technicians, and the like. Primary staff users may include medical personnel employed directly by the medical facility. Secondary staff users may include medical personnel working at the medical facility but not directly employed by the medical facility, such as temporary or subcontracted employees, for example. Secondary staff users may work for one or more staffing agencies or as independent contractors, for example. Staff may be primary staff at one medical facility and secondary staff at other medical facilities. Access and control over the records of a primary staff user by an organization may be limited to the information germane to that organization's business. For example, a hospital may only be able to view the schedule, and control the interface of a staff member with regard to that hospital. The record of a staff user may be more extensive than what is accessible by the individual medical facilities or agencies. Access to the records of staff employed by the medical facility or agency may be limited to the information that concerns the particular medical facility or agency.

A staffing agency may be an organization that hires and markets secondary staff to medical facilities to fill positions that the medical facilities are unable to fill using primary staff. A staffing agency administrator may be a manager of a staffing agency and may have the authority to set policies within a staffing agency defining how the system may be used to facilitate the business of the staffing agency and to coordinate contracts for the agency with medical facilities and secondary staff users. Staffing agency users may include the users with authority to access the records associated with the staff employed by the staffing agency and the records associated with medical facilities that have relationships with the agency.

Certification administrators may be individuals with authority to set policies to facilitate certification of secondary staff user credentials. Certification users may be individuals with authority to enter secondary user credentials and health records into the system 100. Certification users may primarily handle reading and writing records having to do with secondary user credentials, worker status verification, health records, and the like.

In an embodiment, the user interface 110 is used by a user to, among other things, view and interact with the system 100. The user interface 110 may be a system workstation that accesses the system 100 using a smart client, a computer that accesses the system 100 using a web client, and/or a personal digital assistant or cellular phone that accesses the system 100 using a smart-phone client, among other things.

In an embodiment, the settings module 140 is used to set or update user preferences and to do maintenance on the system 100. As a user enters or edits preferences in the settings module 140 changes are saved to the database 150.

In an embodiment, a medical facility administrator may use the settings module 140 to do routine maintenance on the system 100. For example, a medical facility administrator may be able to change the values for the number and type of care hours that a patient in a given unit may require (i.e., acuity) and the number of patients in a given unit (i.e., census), thereby changing the number and types of positions on the unit. Acuity may be separated into skilled acuity and unskilled acuity to assist in determining the experience and qualifications needed by the staff to fill particular positions. A medical facility administrator may also use the settings module 140 to define positions on the unit, develop and maintain schedule templates, change the level of access of subordinate users, maintain passwords, change interface preferences both locally and globally, and/or develop reports and audit how the staffing process is being managed. In an embodiment a medical facility administrator may use the settings module 140 to access and generate messages using the communication module 160 and select messaging parameters, such as type of messages received and pending messages alert preferences, for example. A medical facility administrator may use the settings module 140 to review solicitations sent using the communication module 160 from secondary staff users who wish to develop a relationship with the medical facility. A medical facility administrator may also review time and/or attendance that may be sent using the communication module 160. A medical facility administrator may use the settings module 140 to generate advertisements that may be sent using the communication module 160 to nurses not signed up at the medical facility. For example, the medical facility administrator may send staff users advertisements based on the staff user rating, distance from the medical facility, willingness of the staff user to travel, experience, or area of expertise, among other things.

In an embodiment, the medical facility administrator may use the settings module 140 to set scheduling preferences, such as automatic or manual staff scheduling. For example, automatic scheduling may allow the medical facility administrator to set the system 100 to automatically fill open positions. A medical facility administrator may use the settings module 140 to set automatic scheduling parameters, such as the date the automatic scheduling should occur, giving priority to primary staff, giving priority to staff based on seniority, required rating of secondary staff, acceptable limit of cost of secondary staff, credentials of acceptable users, or agency affiliation, among other things.

In an embodiment, a medical facility administrator may use the settings module 140 to review performance and add or remove individuals from the black list. The black list may be a list of staff that the medical facility administrator chooses not to schedule. The black list may be set up so the staff member is black listed for a set period of time or permanently. The black list may be set up so that it affects one or more units. In an embodiment, a medical facility administrator may review performance and add or remove staff members from the white list. The white list may be a list of staff that has completed the credentialing process and has been deemed acceptable according to the medical facility's policies and procedures for procuring staff.

The credentialing process may include a certification administrator entering staff user credentials into a permanent credential record. In an embodiment, the credentialing process may further include a medical facility administrator entering staff user credentials into a temporary credential record. The system 100 may cross-check the temporary credential record entered by the medical facility administrator with the permanent credential record entered by the certification administrator to ensure that the medical facility entered the appropriate credentials for a specific staff user. In an embodiment, a staff user may not be able to schedule a shift at a particular medical facility until a temporary credential record is created by a medical facility administrator and cross-checked with the permanent credential record.

In an embodiment, a staff user may use the settings module 140 to set parameters concerning the look and feel of the system 100, the type of communications the staff user prefers to receive (e.g., electronic mail, text message, voice mail, among other things), and the distance a staff user is willing to travel, for example. A staff user may use the settings module 140 to set parameters regarding whether to accept solicitations from medical facilities. Staff users may also use the settings module to set parameters concerning pay rate, shift preferences, and type of unit, among other things. A staff user may be able to use the settings module 140 to automatically accept shifts offered at particular times from selected hospitals in selected units, for example. Staff users may also be able to use the setting module 140 to add or remove medical facilities from the black list (medical facilities the staff user may not want to work at) and/or white list (medical facilities that have a work relationship with the staff user).

In an embodiment, a staff agency administrator and/or credentialing administrator may use the settings module 140 to perform maintenance on the system 100. For example, a staff agency administrator and/or credentialing administrator may use the settings module 140 to grant or restrict access to the system and determine the staff user information accessible to its employees, among other things.

In an embodiment, the calendar module 120 is used for scheduling in accordance with the preferences set in the setting module 140. The calendar module 120 may contain information about a user's schedule and information from the schedules of other users. For example, using the calendar module 120 a staff user may view their schedule and also view available schedule openings for medical facilities in accordance with the preferences set using the settings module 140 by the staff user and the various medical facilities. The users may be able to manipulate the information on the calendar module 120 resulting in changes to that user's schedule and other users' schedules. For example, if a medical facility posts one shift opening on a particular day, that shift opening may be viewable on many staff users' calendars depending on the preferences selected by staff users and the medical facility. Once a staff user accepts the shift posted by the medical facility and the medical facility reconfirms the shift acceptance, the staff user's schedule may update to reflect the accepted shift, the medical facility's calendar may update to indicate the accepted shift, the other staff users' calendars may update to indicate the shift is no longer available, and the like. The information available in the calendar module 120 may vary depending on the level of access associated with a user's account. In an embodiment, the calendar module 120 may also be used to schedule personal activities.

In an embodiment, the calendar module 120 may be used by the medical facility administrator to view and manually schedule the available, qualified staff users based on the preferences selected by the medical facility administrator. When a medical facility administrator is manually scheduling, the medical facility administrator may use the calendar module 120 to manually scroll through the list of available staff. The medical facility administrator may use the calendar module 120 to review relevant information associated with the available staff users and select staff users to fill open shifts at the medical facility. For example, after a medical facility administrator updates preferences that indicate an open position on a particular date, at a particular medical facility, open to staff with specified ratings, qualifications, expertise, licenses, certifications, or the like, the medical facility administrator may use the calendar module 120 to view applicable staff users that meet the requirements selected by the medical facility administrator for staff users that have selected preferences indicating availability for the shifts created by the medical facility administrator. Changes to the medical facility administrator's schedule may be stored in the database 150.

In an embodiment, the calendar module 120 may be used by the staff user to block dates the staff user is unavailable, post dates the staff user is available to work and manually accept shifts posted by medical facilities, among other things. When a staff user is manually scheduling, the staff user may use the calendar module 120 to manually scroll through the list of available shifts. The staff user may use the calendar module 120 to review relevant information associated with the available shifts and select available shifts. For example, after a staff user updates preferences and a schedule is generated that indicates open positions on particular dates, at specific times, in particular units, within a specified distance from the staff user's home, or the like, the staff user may use the calendar module 120 to view applicable shifts that meet the requirements selected by the staff user for medical facilities that indicate available shifts that the staff user qualifies for per the medical facilities preferences. Changes to the staff user's schedule may be stored in the database 150.

In an embodiment, the calendar module 120 may interact with the settings module 140 to apply user preferences selected using the setting module 140 to the schedule displayed using the calendar module 120. The calendar module 120 may retrieve the stored preferences selected using the settings module 140 from the database 150. Alternatively, the calendar module 120 may communicate directly (not shown in FIG. 1) with the settings module 140 to obtain user preferences. In an embodiment, the settings module 140 and calendar module may be combined and the preferences may be chosen via options on the schedule in the combined calendar/settings module (not shown in FIG. 1). Examples of staff user preferences selected using the settings module 140 being applied to the schedule of the calendar module 120 may include blocking out black-listed medical facilities, only displaying shifts a staff user is interested in working, blocking out medical facilities not within a selected distance from the staff user, and only displaying preferred units within a medical facility, among other things. Examples of medical facility administrator preferences selected using the settings module 140 being applied to the schedule of the calendar module 120 may include blocking out black-listed staff users, only showing staff users with selected certifications, and only showing staff users with selected ratings, among other things.

In an embodiment, the calendar module 120 may include maps and driving directions to medical facilities. The maps may be interactive maps that display locations of available shifts. The interactive map function may allow a staff user to define parameters such as distance, pay rate, length of contract, and the like. For example, a staff user may select to view what medical facilities are paying the highest on a city, state, national or international level. The interactive map function may be used by staff users to view medical facilities in the immediate area and for staff users looking to relocate, among other things.

In an embodiment, the database 150 may be one or more server computers running software that supports the storage, retrieval, and manipulation of the data used throughout the system 100. Examples of data may include, but is not limited to, staff user information, medical facility information, available openings, schedules, parameters and settings chosen using the settings module 140, messages sent and received using the communication module 160 and settings module 140 or calendar module 120, among other things. The database 150 interacts with the calendar module 120, administrative module 130, setting module 140 and/or communication module 160 in that the database 150 receives and stores information from the other modules 120-140, 160 and/or retrieves and sends information to the other modules 120-140. The database 150 may automatically store data updated in the other modules 120-140, 160 and/or save data at the command of a user using another module 120-140.

In an embodiment, the communication module 160 interacts with the calendar module 120, administrative module 130 and settings module 140 to send and receive messages based on the various user preferences associated with the settings module 140. Messages may include voicemail messages, electronic mail messages, fax messages, and text messages, among other things. Messages may be sent internally to the account of another user of the system 100. For example, the communication module may send a voicemail or electronic mail messages to a user's system account and the user may view or listen to the message using the calendar module 120, administrative module 130, and/or settings module 140. The communication module 160 may also send messages to external systems 170. For example, the communication module may send voicemails, facsimiles, and text messages, among other things, to a user's external telephone number 170 or an electronic mail message to a user's private electronic mail account 170, such as a Hotmail or Yahoo! electronic mail account, among other things. In an embodiment, the communication module 160 may also send user messages to the database 150 to store sent and/or received messages.

In an embodiment, a user of the system 100 may use the communication module 160 to confirm a scheduling request or report a scheduling cancellation, among other things. For example, after a staff user selects preferences, a schedule is generated, the staff user schedules a shift and the proposed schedule is reviewed and approved by the staff user, the calendar module 120 may direct the communication module 160 to send a confirmation message to the medical facility administrator. The medical facility administrator may then send a reconfirmation message via the communication manager 160 confirming the shift acceptance, send a message declining the shift acceptance, or send a message cancelling the shift, among other things. In an embodiment, the system 100 may be set up not to require reconfirmation messages after a posted shift is accepted by a staff user and a confirmation message is sent at the direction of the calendar module 120 via the communication module 160 to the medical facility administrator's inbox in the settings module 140 and/or calendar module 120.

In an embodiment, the administrative module 130 is used to handle accounting functions, human resources functions, and reporting functions, among other things, supported by the system 100. Access to particular functions of the administrative module 130 may vary depending on the class of user. For example, a certification administrator and/or user may access the human resource sub-module (not shown in FIG. 1) of the administrative module 130 to update user certifications. The staff agency administrator, staff agency users, and/or medical facility administrators may have access to certification and license tracking functions to assist in tracking staff user certification and license renewal dates. Staff users may be able to access the human resource sub-module to view their certifications and licenses. The administrative module 130 may interact with the database 150 to store and retrieve information regarding the accounting functions, human resources functions, and reporting functions, among other things, handled by the administrative module 130.

In an embodiment, the administrative module may have an accounting sub-module (not shown in FIG. 1) for billing medical facilities for staff user services, paying staff users, tracking staff purchases that are tax deductible, and the like. The staff agency administrator, staff agency users and other users with access to the accounting sub-module, may be able to record these various expenses directly into the system to assist them in record keeping and preparing taxes, among other things.

In an embodiment, the administrative module 130 may also include a human resources sub-module (not shown in FIG. 1) for tracking staff user training, certification, licensing, and the like. The human resources sub-module of the administrative module 130 may include informing the staff agency administrator, staff agency users, medical facility administrator, certification administrator and/or certification users when it is time to renew licenses and certifications, among other things. Medical facility administrators and staffing agency users may record performance reviews, recommend training classes, and the like. Additionally, the numbers of hours a staff user has worked, vacation hours used or accrued, missed work, cancelled shifts, and the like may be reported and recorded using the human resources sub-module. In an embodiment, a rating may be generated by the human resources sub-module using staff user reviews completed by a staff user's supervisor at the medical facility and entered by the medical facility administrator using the human resources sub-module. A staff user review may include information regarding performance, attendance, cancellations, punctuality and the like. The information stored for a staff user by the human resources sub-module in the database 150, such as the rating, licenses, certifications, and the like, may be used by the settings module 140 when medical facility administrators select preferences regarding the rating and qualifications of a staff user for a particular shift.

In an embodiment, the administrative module 130 may include a reporting sub-module for creating reports from the data managed by the system 100. For example, a staff user may create reports regarding mileage tracking based on distances to medical facilities where work was performed or expense tracking for uniforms or other items purchased for work. The reporting sub-module may use information from the calendar module or external links in creating reports. For example, if tracking the mileage traveled to and from a hospital for a staff user, the reporting sub-module may interact with information stored in the database 150 by the interactive map function in conjunction with the staff user's schedule in the calendar module 120 to determine the distances traveled by a staff user. In another example, the reporting sub-module may track receipts from linked external systems, such as a uniform sales link, lodging link and travel link, among other things, to track expenses. A staff user may also manually enter expenses and mileage using the reporting sub-module. In another embodiment, the administrative module 130 may include downloadable forms, contracts and the like. For example, staff users may download unit tests on proficiencies (e.g., medication administration and safety, patients' rights, emergency room proficiency, medical surgical proficiency, etc.) to complete and submit to medical facilities prior to scheduling. In an embodiment, the administrative module 130 may also include education information and web page links to companies and institutions that provide certification, continuing education credits, college courses, and the like. In another embodiment, the administrative module 130 may include policy manuals for various medical facilities, staffing agencies, certification agencies, and the like. The administrative module may also include links to outside services and organizations that may facilitate a staff user's business activities. For example, the administrative module may include links to travel, housing, professional services and insurance information, among other things.

In operation, a user logs into the system 100 and may choose to access the calendar module 120, the administrative module 130 and/or the settings module 140. The amount of access to information on the system 100 may vary depending on the user class. If the user accesses the administrative module 130 to perform accounting functions, human resources functions, and/or reporting functions, the administrative module 130 may retrieve the requested information from the database 150 and display the information on the user interface 110. While the user interacts with the information from the administrative module 130 and once the user is finished viewing and interacting with the information displayed by the administrative module 130 on the user interface 110, all changes made to the information associated with the administrative module 130 may be stored to the database 150.

If the user accesses the settings module 140, the user may be able to enter or edit user preferences such as method of communication preferences, automatic or manual scheduling, travel distance, pay rate, preferred medical facilities or staff users (white list), blocked medical facilities or staff users (black list), among other things. The types of preferences available may vary depending on the user class. Using the settings module 140, a user may also be able to view and send messages to other users via the communication manager 160.

As a user edits or adds information to the settings module, the settings module 140 stores the updated information to the database 150.

If a staff user accesses calendar module 120, the staff user may be able to block dates the staff user is unavailable, post dates the staff user is available to work and manually accept shifts posted by medical facilities, among other things. If a staff user manually accepts a shift, an acceptance message is sent via the communication module 160 to the medical facility administrator that posted the shift and the staff user's schedule is updated to show a pending shift. The medical facility administrator may then reconfirm or decline the shift acceptance by viewing the message in the medical facility administrator's settings module 140 and/or the calendar module 120. A reconfirm or decline message may then be sent via the communication module 160 from the medical facility administrator to the staff user. If the medical facility administrator reconfirmed the shift acceptance, the medical facility and staff user schedules may be updated to reflect the confirmed shift acceptance. If the medical facility administrator declined the shift acceptance, the staff user's schedule may update to reflect that the shift is no longer available and the medical facility administrator's schedule may update to reflect that the shift was cancelled, filled by another staff user or is still available depending on the reason for declining the shift acceptance. Changes to a user's schedule may change various users' schedules. As changes are made to a user's schedule, the calendar module 120 stores the updated local and/or global changes to the database 150. A staff user may also access map views to show suggested routes to a scheduled medical facility or to view an interactive map showing available shifts at medical facilities based on the staff user's map preferences.

Figure 2:
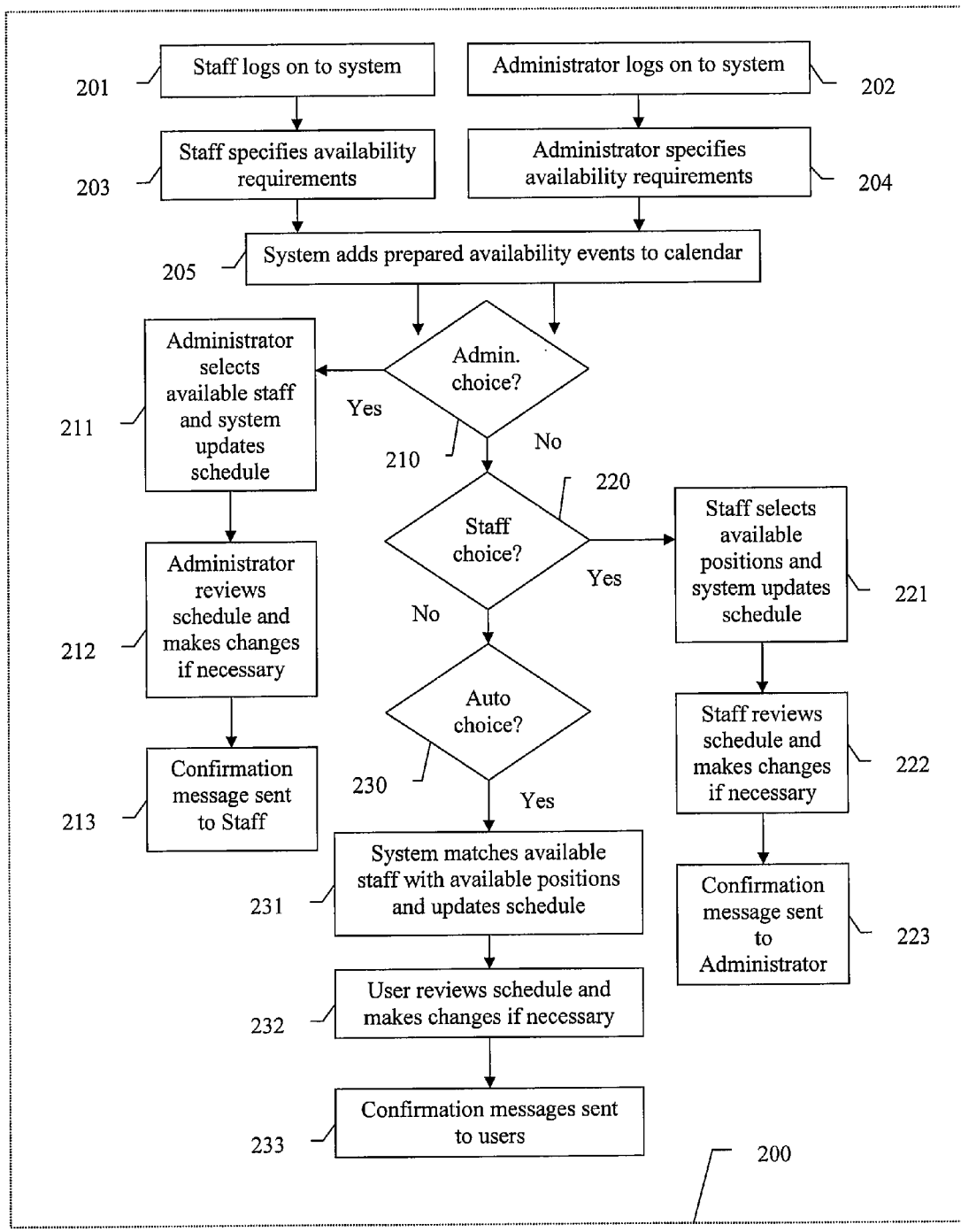
FIG. 2 illustrates a flow diagram for a method for computer network scheduling and communication in accordance with an embodiment of the present invention.

FIG. 2 illustrates a flow diagram for a method for computer network scheduling and communication in accordance with an embodiment of the present invention.

First, at step 201, the staff user logs into the system 100. The staff user is presented with a desktop that may be customizable for the staff user's preferences using the settings module 140. The staff user may be able to choose which of the several modules 120-140 may display on the desktop, the color scheme, and the like.

Similarly, at step 202, the medical facility administrator logs into the system 100. The medical facility administrator is also presented with a desktop that may be customizable for the medical facility administrator's preferences using the settings module 140. The medical facility administrator may be able to choose which of the several modules 120-140 may display on the desktop, the color scheme, and the like.

At step 203, a staff user may specify availability requirements using the settings module 140 to set parameters concerning the distance a staff user is willing to travel, pay rate, shift preferences, and type of unit, among other things. A staff user may use the settings module 140 to set parameters regarding whether to accept solicitations from particular medical facilities. A staff user may be able to use the settings module 140 to automatically accept shifts offered at particular times from selected hospitals in selected units, for example. Staff users may also be able to use the setting module 140 to add or remove medical facilities from the black list and/or white list. A staff user may further specify availability requirements by accessing the calendar module 120 and blocking out dates on the schedule that the staff user is not available, identifying dates on the schedule that the staff user would like to work, and the like.

At step 204, a medical facility administrator may use the settings module 140 to specify availability requirements by selecting preferences for the positions needed to be filled. For example, a medical facility administrator may be able to change the values for the number and type of care hours that a patient may require (i.e., acuity) and the number of patients in a given unit (i.e., census), thereby changing the number and types of positions on the unit. Acuity may be separated into skilled acuity and unskilled acuity to assist in determining the experience and qualifications needed by the staff to fill particular positions. In another example, a medical facility administrator may also use the settings module 140 to define positions on the unit, develop, maintain schedule templates, and review solicitations sent using the communication module 160 from secondary staff users who wish to develop a relationship with the medical facility.

In yet another example, a medical facility administrator may specify availability requirements using the settings module 140 to generate advertisements that may be sent using the communication module 160 to staff users not associated with the medical facility. For example, the medical facility administrator may send staff users advertisements based on the staff user rating, distance from the medical facility, willingness of the staff user to travel, experience, or area of expertise, among other things. The medical facility administrator may use the settings module 140 to set scheduling preferences, such as automatic or manual staff scheduling. For example, automatic scheduling may allow the medical facility administrator to set the system 100 to automatically fill open positions. A medical facility administrator may use the settings module 140 to set automatic scheduling parameters, such as the date the automatic scheduling should occur, giving priority to primary staff users, required rating of secondary staff, acceptable limit of cost of secondary staff, credentials of acceptable users, or agency affiliation, among other things.

The settings module 140 may be used by a medical facility administrator to specify availability requirements by reviewing staff user performance and adding or removing individuals from the black list. The black list may be set up so the staff user is black listed for a set period of time or permanently. The black list may be set up so that it affects one or more units. A medical facility administrator may also review performance and add or remove staff user from the white list. A medical facility administrator may further specify availability requirements by accessing the calendar module 120 and blocking out dates that staff users are not needed, among other things. In an embodiment, the settings 140 and calendar module 120 may be incorporated into one module that a user may use to set preferences, interact with the user schedule, send and receive messages, and the like.

Then at step 205, the system 100 adds the prepared availability events to the schedule in the calendar module 120 based on the settings chosen by the staff user 203 and the medical facility administrator 204. As a user enters or edits preferences in the settings module 140 or specifies availability requirements using the schedule in the calendar module 120, the changed preferences are stored on the database 150, the calendar module 120 is updated based on the user preferences, and the updated schedule in the calendar module 120 is stored in the database 150. The updated open shifts or available staff may be reflected in the user accounts affected by the schedule change. For example, a medical facility administrator updates preferences that indicate an open position on a particular date, at a particular medical facility, open to staff with specified ratings, qualifications, expertise, licenses, certifications, or the like. The open position may be posted to the medical facility administrator's schedule in the calendar module 120, in the schedules of staff users that meet the medical facility administrator's requirements, in the schedules of staff agency administrator's and/or staff agency user's that work with the medical facility of the medical facility administrator, and the like.

Next, at step 210, if the medical facility administrator chose the manual scheduling function, the medical facility administrator may use the calendar module 120 to manually choose the staff available based on the selected preferences of the medical facility administrator.

At step 211, the schedule in the calendar module 120 may be used by the medical facility administrator to view and manually schedule from the available staff users. When a medical facility administrator is manually scheduling, the medical facility administrator may use the calendar module 120 to manually scroll through the list of available staff and select available staff users. The medical facility administrator may use the calendar module 120 to review relevant information associated with the available staff users and select staff users to fill open shifts at the medical facility. For example, after a medical facility administrator updates preferences that indicate an open position on a particular date, at a particular medical facility, open to staff with specified ratings, qualifications, expertise, licenses, certifications, or the like, the medical facility administrator may use the calendar module 120 to view applicable staff users that meet the requirements selected by the medical facility administrator for staff users that have selected preferences indicating availability for the shifts created by the medical facility administrator. Changes to the medical facility administrator's schedule may be stored in the database 150.

Next, at step 212, once the medical facility administrator manually selects available staff users and the schedule updates, the schedule is presented to the medical facility administrator and the medical facility administrator has the opportunity to make changes, such as swapping out staff users, cancelling individual positions, and even cancelling the entire schedule if so desired. Once the schedule is accepted, the medical facility administrator's schedule in the calendar module 120 may update to show the shift scheduled as pending. Changes to the medical facility administrator's schedule may be stored in the database 150. In an embodiment, the medical facility administrator may select preferences using the settings module 140 to bypass step 212 if the medical facility administrator prefers to automatically accept schedule changes instead of reviewing selected schedule changes.

Then, at step 213, a confirmation message is sent to the staff user via the communication module 160. The staff user may then send a reconfirmation message confirming the shift acceptance or send a message declining the shift acceptance, among other things. Once a staff user is selected by the medical facility administrator and reconfirmed by the staff user, the staff user's schedule and medical facility administrator's schedules may be updated to show the shift scheduled as confirmed. The shift may also be removed as an open shift from other staff users' schedules. In an embodiment, the system 100 may be set up not to require reconfirmation messages after an availability posting by a staff user is accepted by a medical facility administrator.

At step 220, if the staff user chose the manual scheduling function, the staff user may use the calendar module 120 to manually choose the available positions based on the selected preferences of the staff user.

At step 221, the schedule in the calendar module 120 may be used by the staff user to view and manually schedule from the available shifts. When a staff user is manually scheduling, the staff user may use the calendar module 120 to manually scroll through the list of available shifts and select available shifts. The staff user may use the calendar module 120 to review relevant information associated with the available shifts and select open shifts. For example, after a staff user updates preferences that indicate availability on a particular date, at a particular medical facility, at a particular time, in a specific unit, or the like, the staff user may use the calendar module 120 to view applicable medical facility positions that meet the requirements selected by the staff user for shifts the staff user is qualified for at medical facilities that have selected preferences indicating availability. Changes to the staff user's schedule may be stored in the database 150.

Next, at step 222, once the staff user manually selects available shifts and the schedule updates, the schedule is presented to the staff user and the staff user has the opportunity to make changes, such as swapping shifts, cancelling individual shifts, and even cancelling the entire schedule if so desired. Once the schedule is accepted, the staff user's schedule in the calendar module 120 may update to show the shift scheduled as pending. Changes to the staff user's schedule may be stored in the database 150. In an embodiment, the staff user may select preferences using the settings module 140 to bypass step 222 if the staff user prefers to automatically accept schedule changes instead of reviewing selected schedule changes.

Then, at step 223, a confirmation message is sent to the medical facility administrator via the communication module 160. The medical facility administrator may then send a reconfirmation message confirming the shift acceptance, send a message declining the shift acceptance, or send a message cancelling the shift, among other things. Once a shift is accepted by the staff user and reconfirmed by the medical facility administrator, the staff user's schedule and medical facility administrator's schedules may be updated to show the shift scheduled as confirmed. The shift may also be removed as an open shift from other staff users' schedules. In an embodiment, the system 100 may be set up not to require reconfirmation messages after a posted shift is accepted by a staff user and a confirmation message is sent.

At step 230, if the medical facility administrator and/or staff user chose the automatic scheduling function, the system 100 may automatically match available staff and open positions based on the selected preferences of the staff user and medical facility administrator.

At step 231, the system 100 matches available staff with available positions based on both users' preferences and updates the schedule. Once the availability events are matched and posted to the schedule in the calendar module 120, the updated schedule is stored in the database 150.

Next, at step 232, once the schedule is generated, the schedule may be presented to the user so the user has the opportunity to make changes, such as swapping shifts, cancelling individual shifts, and even cancelling the entire schedule if so desired. Once the schedule is accepted, the staff user's schedule in the calendar module 120 may update to show the shift scheduled as pending. Changes to the staff user's schedule may be stored in the database 150. In an embodiment, the staff user may select preferences using the settings module 140 to bypass step 232 if the staff user prefers to automatically accept schedule changes instead of reviewing automatically selected schedule changes.

Then, at step 233, a confirmation message is sent to the medical facility administrator and the staff user via the communication module 160. After the system automatically schedules a shift based on the user preferences, the staff user's schedule and medical facility administrator's schedules may update to show the shift scheduled as confirmed. The shift may also be removed as an open shift from other staff users' schedules. In an embodiment, the system 100 may be set up to require reconfirmation messages after shifts are automatically scheduled. If reconfirmation is required, the scheduled shift may remain pending until one or both of the staff user and medical facility administrator reconfirm the scheduled shift, depending on the system settings. In an embodiment, the system 100 may send out a shift invitation message to all qualified and available staff users and the first staff user to respond (automatically or otherwise) may be assigned the shift.

Thus, certain embodiments reduce cost, save time, and find more suitable potential employees for a company by having direct contact with potential employees to learn about the potential employees and expedite the scheduling process. Additionally, potential employees save time and find more suitable employers by having some control of how, when, where and for who a potential employee is marketed. Certain embodiments also reduce the cost of staff and the office space needed for scheduling tasks by minimizing the role of the agency.

While the invention has been described with reference to certain embodiments, it may be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention may include all embodiments falling within the scope of the appended claims.

The invention claimed is:

1. A system for computer network scheduling and communication, the system comprising: a settings module of at least one processing device configured to: receive staff preferences comprising location information and availability information, and receive administrator preferences comprising number of positions information, type of positions information, and qualifications for positions information; a calendar module of the at least one processing device configured to: generate a plurality of user-specific schedules based on the staff preferences and the administrator preferences, wherein the plurality of user-specific schedules comprise one or more of at least one available shift and at least one available staff; receive at least one of: a staff selection of the at least one available shift, an administrator selection of the at least one available staff, and an automatic selection matching the at least one available shift and the at least one available staff based on the staff preferences and the administrator preferences, and update the plurality of user-specific schedules based on a response to a confirmation of scheduled appointment message; and a communication module of the at least one processing device configured to: send the confirmation of scheduled appointment message based on at least one of the staff selection, the administrator selection, and the automatic selection, and receive the response to the confirmation of scheduled appointment message.

2. The system of claim 1, comprising an administrative module of the at least one processing device configured to perform at least one of:
   at least one accounting function,
   at least one human resources function, and
   at least one reporting function.

3. The system of claim 2, comprising a database configured to store information associated with the administrative module.

4. The system of claim 2, wherein the at least one accounting function is configured to at least one of:
   bill employers for employee services, pay employees, and track employee expenses.

5. The system of claim 2, wherein the at least one human resources function is configured to at least one of:
   track employee training,
   monitor employee and/or employer credential renewal dates,
   record employee hours,
   receive employee performance reviews, and
   generate employee ratings.

6. The system of claim 3, wherein the at least one reporting function is configured to create reports based on information associated with the administrative module stored in the database.

7. The system of claim 1, wherein the settings module is configured to generate the confirmation of scheduled appointment message sent by the communication module and display the response to the confirmation of scheduled appointment message received by the communication module.

8. The system of claim 1, wherein the administrator preferences further comprise at least one of:
   employee priority, and
   employee rating.

9. The system of claim 1, comprising a database configured operable to store a plurality of:
   the staff preferences,
   the administrator preferences,
   the plurality of user-specific schedules,
   the confirmation of scheduled appointment message, and
   the response to the confirmation of scheduled appointment message.

10. The system of claim 1, wherein the communication module automatically sends the confirmation of scheduled appointment message to confirm a scheduled appointment.

11. The system of claim 1, wherein the communication module is configured to send a scheduling advertisement.

12. A method for computer network scheduling and communication, the method comprising: performing by at least one processing device, at least: receiving staff preferences comprising location information and availability information; receiving administrator preferences comprising number of positions information, type of positions information, and qualifications for positions information; generating a plurality of user-specific schedules based on the staff preferences and the administrator preferences, wherein the plurality of user-specific schedules comprise at least one of at least one available shift and at least one available staff; receiving a selection of a scheduling event, wherein the selection of the scheduling event comprises at least one of: a staff selection of the at least one available shift, an administrator selection of the at least one available staff, and an automatic selection matching the at least one available shift and the at least one available staff based on the staff preferences and the administrator preferences; sending a confirmation of scheduled appointment message based on the received selection of the scheduling event; receiving a response to the confirmation of scheduled appointment message; and updating the plurality of user-specific schedules based on the received response.

13. The method of claim 12, comprising approving the selection of the scheduling event.

14. The method of claim 12, comprising updating the plurality of user-specific schedules based on the selection of the scheduling event.

15. The method of claim 12, wherein the staff preferences further comprise at least one of:
   employee compensation, and
   employment unit type.

16. The method of claim 12, wherein the administrator preferences further comprise at least one of:
   employee priority, and
   employee rating.

17. The method of claim 12, comprising storing, in at least one database, a plurality of:
   the staff preferences,
   the administrator preferences,
   the plurality of user-specific schedules,
   the confirmation of scheduled appointment message, and
   the response to the confirmation of scheduled appointment message.

18. The method of claim 12, wherein the sending a confirmation of scheduled appointment message based at least in part on the received selection of the scheduling event is automatically performed by the at least one processing device.

19. A non-transitory computer-readable storage medium including a set of instructions for execution on a computer, the set of instructions comprising: a staff preferences routine for receiving staff preferences comprising location information and availability information; an administrator preferences routine for receiving administrator preferences comprising number of positions information, type of positions information, and qualifications for positions information; a schedule generation routine for generating a plurality of user-specific schedules based on the staff preferences and the administrator preferences, wherein the plurality of user-specific schedules comprise at least one of at least one available shift and at least one available staff; a schedule selection routine for receiving a selection of a scheduling event, wherein the selection of the scheduling event comprises at least one of: a staff selection of the at least one available shift, an administrator selection of the at least one available staff, and an automatic selection matching the at least one available shift and the at least one available staff based on the staff preferences and the administrator preferences; a send message routine for sending a confirmation of scheduled appointment message based on the received selection of the scheduling event; a receive message routine for receiving a response to the confirmation of scheduled appointment message; and a schedule update routine for updating the plurality of user-specific schedules based on the received response.

20. The non-transitory computer-readable storage medium including the set of instructions of claim 19, further comprising a review schedule routine for approving the selection of the scheduling event.

21. The non-transitory computer-readable storage medium including the set of instructions of claim 19, comprising an update routine for updating the plurality of user-specific schedules based on the selection of the scheduling event.

22. The non-transitory computer-readable storage medium including the set of instructions of claim 19, comprising a storage routine for storing, in at least one database, a plurality of:
   the staff preferences,
   the administrator preferences,
   the plurality of user-specific schedules,
   the confirmation of scheduled appointment message, and
   the response to the confirmation of scheduled appointment message.

* * * * *